United States Patent [19]

Basily et al.

[11] 4,343,208
[45] Aug. 10, 1982

[54] METHOD AND APPARATUS FOR SHEARING METAL BILLETS

[75] Inventors: Basily B. Basily, Cairo, Egypt; Mihir K. Das, Selly Park, England; Clifford G. Price, Stourbridge, England; Stephen A. Tobias, Selly Park, England

[73] Assignee: National Research Development Corporation, London, England

[21] Appl. No.: 184,971

[22] Filed: Sep. 8, 1980

[30] Foreign Application Priority Data

Sep. 12, 1979 [GB] United Kingdom ................ 7931594

[51] Int. Cl.$^3$ ............................................. B23D 15/00
[52] U.S. Cl. .......................................... 83/13; 83/196
[58] Field of Search ............................ 83/196, 13, 199

[56] References Cited

U.S. PATENT DOCUMENTS 543,275  7/1895  Vernet ................................. 83/196
584,656  6/1897  Vernet ................................. 83/196
3,863,535  2/1975  Hamano et al. ..................... 83/196

OTHER PUBLICATIONS

Cropping of Pipes, Rods & Shaped Rolled Steels by Using Toolsets with Differential Clamping Pressure, A. A. Loginov, Kuznechno—Shtampovochnoe Prazvodstvo, vol. 20, Part I, pp. 40-42, 1978.

Primary Examiner—Frank T. Yost
Attorney, Agent, or Firm—Cushman, Darby & Cushman

[57] ABSTRACT

A method of shearing a workpiece, for example a metal billet or bar, and apparatus for carrying out that method. Before being subjected to linear shear, the billet is first subjected to substantial torque about an axis perpendicular to the plane of shear. The billet is held by two pivoting arms, the predominant torque of the first stage of the method is achieved by allowing the pivot points of the arms to slide as the arms turn, and the predominant shear of the second stage is then achieved by arresting that sliding movement by stops. The parts of the arms which grip the workpiece may bear against a fixed surface during the whole operation, so holding the axis of the workpiece to a constant location.

8 Claims, 3 Drawing Figures

METHOD AND APPARATUS FOR SHEARING METAL BILLETS

This invention relates to a method of shearing, and to apparatus to carry out the method. It relates especially to the cropping of billets and bars of both ferrous and non-ferrous metals. Modern cold forging of such billets and bars calls for their shape to be accurate within small tolerances, especially in the case of billets whose length is not very much greater than their depth. By shearing we mean the process in which a workpiece is severed by a predominantly shearing action by means of members that apply opposed severing forces to the outer walls of the workpiece, without those members requiring to become interposed, at any stage of the process, between the parts being severed. Shear applied in this simple way is today often incapable of severing metal rods and billets with the accuracy required for subsequent processes such as cold forging: in particulaar it fails reliably to achieve the necessary flatness of the severed faces and the necessary precision of shape. In particular, automated forging processes require a square end to a cropped billet in order for that billet then to be accurately located in a die by rotots. One well known way of improving the accuracy of both of these characteristics is to precede the shearing action—regardless of whether this is to be mainly linear or torsional in character—by marking a peripheral notch around the wall of the workpiece to coincide with the intended plane of the shear. This process can be effective but is time-consuming and therefore expensive.

Methods and apparatus of shearing have also been proposed in which a lesser but significant component of torsional shear is mixed with a predominant linear action. One such method and apparatus is described in an article by A. A. Loginov on pages 40 to 42 of Kuznechno-Shtampovachnoe Prazvodstvo, Vol. 20, Part 1, 1978. In a typical apparatus described in this article the workpiece—a metal bar—is gripped by two jaw units axially close to each other. Each unit is mounted on a separate arm, and each arm is mounted to pivot about a separate fixed axis. These two axes lie parallel to each other and to the axis of the bar. To execute the crop, a ram bears simultaneously against the two arms in a direction which bisects at right angles the distance between the two pivot axes. The arms therefore tend to pivot in opposite rotary senses and when the ram force reaches the required level the bar shears, nominally in a plane lying perpendicular to the three axes and coinciding with the small axial clearance between the two jaw units. The severance of a workpiece held by such swinging components must clearly be due to a simultaneous mixture of linear and torsional shear, the proportions of the mixture being dictated by such apparently fixed dimensions as the separation of the pivot axes and the lengths of the arms.

The present invention arises from realising in general that a controlled combination of torsional and linear shearing can lead to improved cropping, and in particular that the controlled application of torsion at the beginning of a cropping process can help to define a plane of separation before separation actually takes place. According to the invention, a method of shearing a workpiece comprises two successive stages, in the first of which the workpiece is subjected to torque about an axis perpendicular to the intended plane of the shear, and in the second of which the workpiece is subjected to linear shear in that plane. The work is preferably held throughout the method by two dies lying closely, one to either side of the shear plane, and the torque of the first stage is applied about an axis passing through the centroid of a transverse section of the workpiece.

The workpiece may be so supported, that in the first stage of the method it is subjected mainly to torque but also in a lesser degree to linear shear, while in the second stage it is subjected more to linear shear but less to torque.

The invention also includes apparatus to carry out such methods. Such apparatus may comprise two lever arms mounted to pivot about parallel axes and each arm carries a jaw unit to grip the two parts of the workpiece that are to be severed by the crop. The pivot fulcra of the two arms are mounted to slide, with stops, preferably adjustable, to limit the extent of such sliding movement; during the first stage of the method the fulcra slide until they meet the stops, after which the fulcra are fixed during the second stage of the method. A controlled resistance may be provided to the sliding travel of the pivot fulcra, whereby to regulate the proportion of torque to linear shear in the first stage of the method.

The directions of sliding travel of the two fulcra may be parallel, and preferably co-linear. The apparatus may also include a slide, mounted to bear against the jaw unit end of at least one of the lever arms, whereby to impart relative movement to the arms in both stages of the method. The slide preferably bears against both lever arms so as to pivot them in opposite rotary senses, and is mounted to slide along a path that intersects the axis of the workpiece ar right angles.

The workpiece may typically be ferrous or non-ferrous metal rod or bar, of round, polygonal or other axisymmetric section, including hollow sections.

The invention is also stated by the claims at the end of this specification and will now be described, by way of example, with reference to the accompanying simplified drawings in which:

Figure 1:
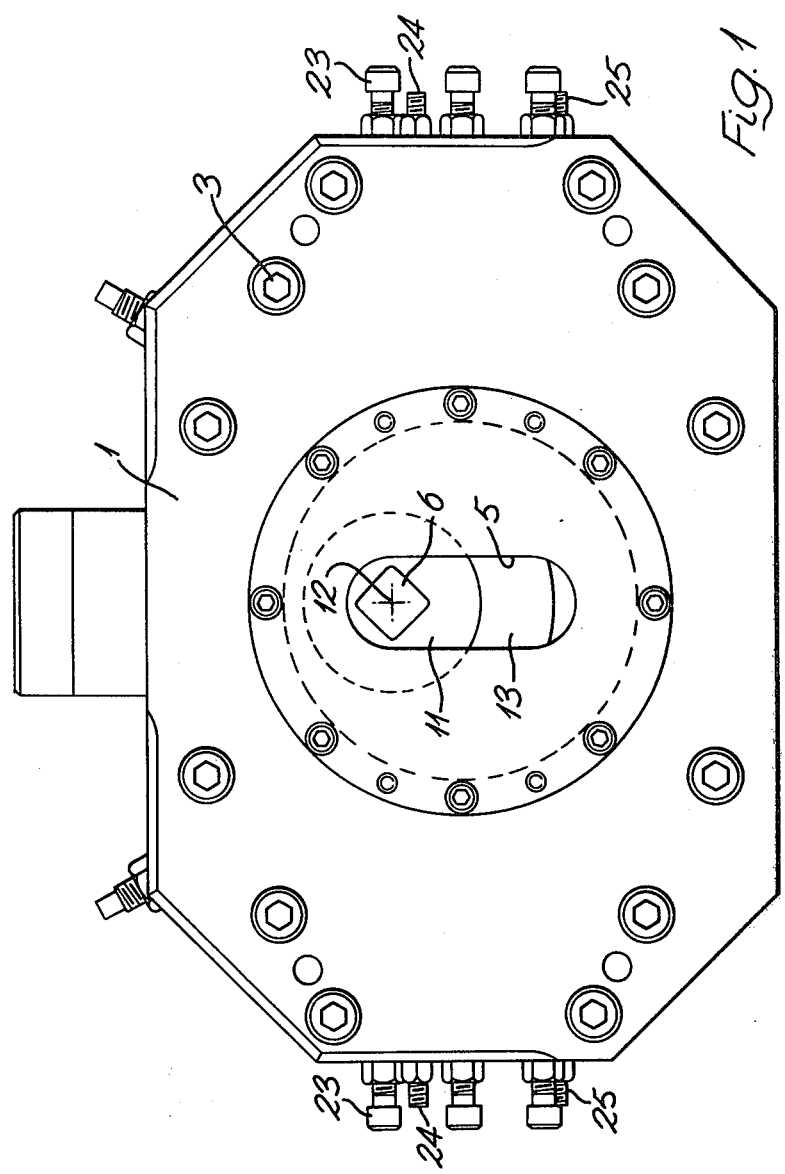
FIG. 1 is an end elevation of one apparatus.

The apparatus comprises a chamber bounded by flat end plates 1 and 2 held apart by bolts 3 which engage with threaded recesses 4 in plate 2. Plates 1 and 2 are formed with elongated cavities 5 to accomodate a square-sectioned workpiece 6.

Inside the apparatus the workpiece is held by two cropping jaw or die units presenting a square hole to receive and hold the workpiece. These units are shown as being of one piece, but composite units of more than one piece are possible. The first unit 7 is mounted in the circular head 8 of an arm 9, the tail end 10 of which is rounded. The other cropping jaw unit 11 is visible in FIG. 1, but not in FIG. 2, where it lies directly behind unit 7 in the direction of the axis 12 of workpiece 6. Jaw unit 11 is held by the circular head 13 of a second arm 14 having a rounded end 15. The necessary positive grip between each jaw unit and its arm, preventing relative movement between the unit and the head of the arm in use, may be effected in many ways well known in the art, for instance by means of clamping rings as shown in FIG. 3. Ends 10 and 15 are mounted in matching rounded sockets in pistons 16 and 17 respectively, so that arms 9 and 14 may pivot about axes 18 and 19 which lie parallel to each other and to axis 12. Pistons 16 and 17 are mounted to slide in cavities 20 and 21 which share a common axis 22. Cavities 20 and 21 contain stop screws 23 to control the possible extent of travel of pistons 16 and 17; the cavities are also filled with hydraulic fluid under pressure from sources 27 by way of conduits 24 and 25 and valves 26, so that by controlling the valves 26 the resistance to sliding movement of pistons 16 and 17 may be varied.

When workpiece 6 is in place, held by cropping jaw units 7 and 11, the cropping force is supplied by a slide 28 located within a cylindrical guide 29 carried by end plate 2 and prevented from rotation by a pin-and-slot device 30. Slide 28 bears simultaneously against the heads 8 and 13 of arms 9 and 14. In the first stage of the cropping process, as slide 28 descends, the pistons 16 and 17 are forced up their respective cavities 20 and 21 so that the workpiece undergoes significant torque about axis 12, together with a proportion of shear in a direction parallel to the movement of the slide, this proportion being determined by whatever resistance to the movement of pistons 16 and 17 is created by the hydraulic circuits and in particular the setting of valves 26. When pistons 16 and 17 meet stops 23 the pivot axes 18 and 19 become fixed, and thereafter the method enters its second stage in which the action of jaw units 7 and 11 upon workpiece 6 is predominantly one of linear shear, with a minor proportion of torque due to the essentially rotary geometry of the arms by which the jaws are carried. When the workpiece has severed, the arm heads 8 and 13 may come to rest on a resilient pad 31 carried by face 1; compression springs 32 then return the arms to their starting positions which are defined by set screws 33.

Figure 2:
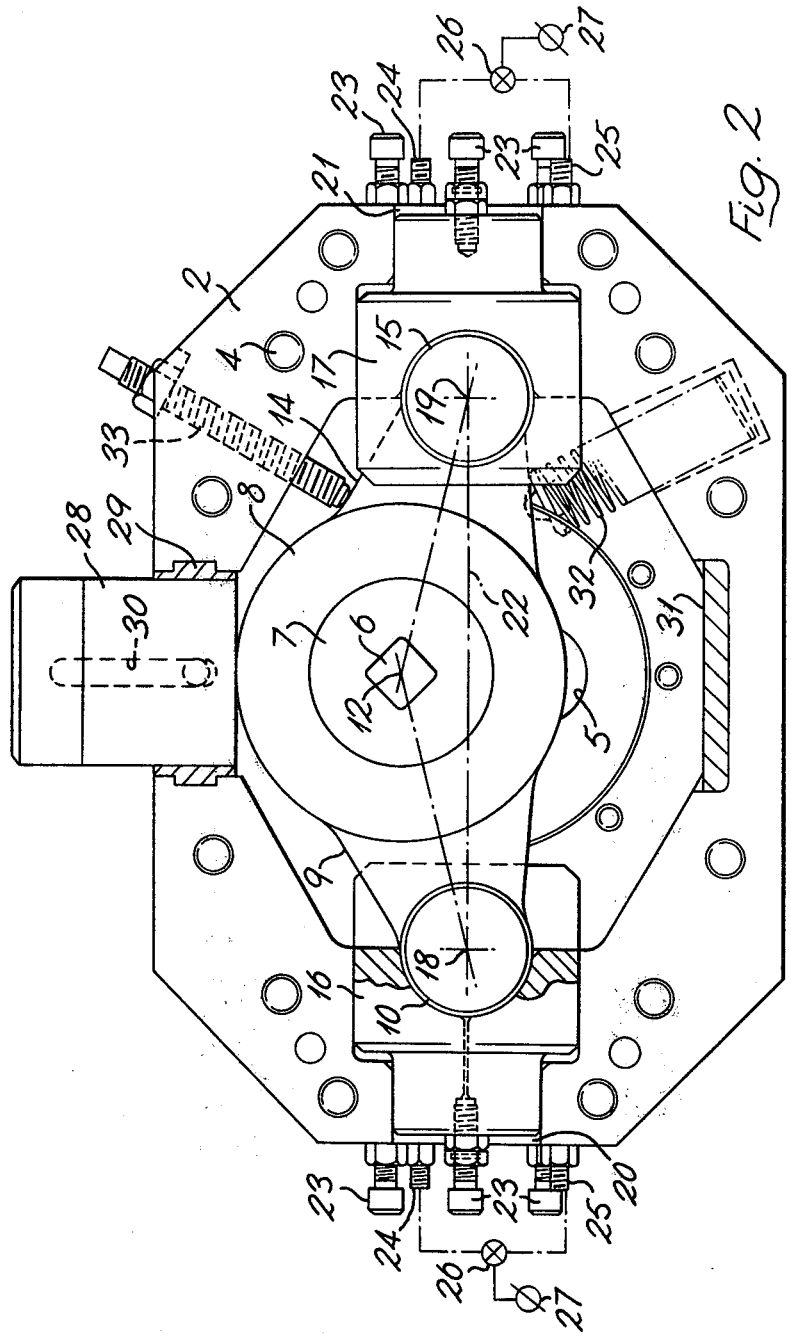
FIG. 2 is a similar view of the same apparatus but in the opposite direction, with an end plate removed and with some internal parts shown in section.
Figure 3:
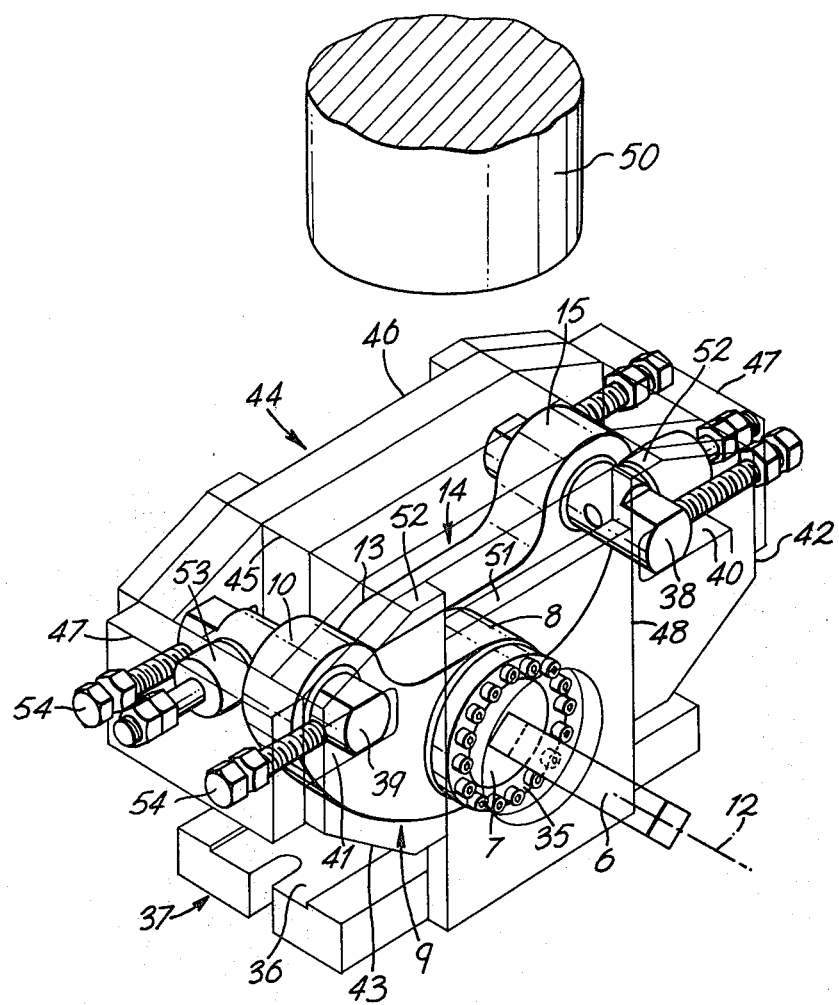
FIG. 3 is a pictorial perspective view of another apparatus.

It will have been apparent that each cycle of operation of the apparatus shown in FIGS. 1 and 2 requires the workpiece 6 to move bodily downwards as a crop takes place, and then upwards again in preparation for the next crop. Such continual vertical movement of the workpiece may be inconvenient, especially if the workpiece is long. With the apparatus of FIG. 3 such movement is avoided. In this apparatus jaw units 7 and 11 (unit 11 is not shown) are mounted in the heads 8 and 13 of arms 9 and 14 as before, and the drawing shows a clamping flange 35 (already mentioned) by which a positive lock between unit 7 and head 8 is achieved in use; a similar flange (not shown) locks unit 11 to head 13. In use, however, arm heads 8 and 13 bear constantly against the upward-facing surface 36 of a fixed base unit 37, so that the vertical location of the workpiece axis 12 remains substantially constant. To enable this constancy to be achieved the tail ends 15 and 10 of arms 14 and 9 are mounted respectively on pivot bars 38 and 39. These bars are mounted to slide respectively in horizontal slots 40 and 41 formed in flanges 42 and 43 mounted at each side of a framework 44 which also includes spacers 45, longitudinal members 46 and end plates 47. At each side of frame 44 the flanges 42 and 43 define a vertical slot, in which an apertured plate 48 mounted on base unit 37 makes a sliding fit.

FIG. 3 shows framework 44 and base 37 in the relative positions that they occupy when a crop is about to begin, with the framework at the highest position relative to the base that it occupies at any time during the cropping cycle. To make the crop, a ram 50, similar in function to slide 28 of FIGS. 1 and 2, descends vertically and bears against the upper surfaces of framework 44 to force it downwards relative to base 37 so that plates 48 slide within the slots defined between flanges 42 and 43 and the upper edges 51 of the plates 48, approach the level of the upper edges 52 of the flanges. In the first stage of the descent of the framework 44, the pivot bars 38 and 39 are free to slide horizontally outwards in their slots 40 and 41. The workpiece held in jaw units 7 and 11 thus undergoes significant torque about axis 12, together with a minor proportion of shear in a direction parallel to the movement of ram 50, this proportion being determined by whatever resistance is presented to the sliding of bars 38 and 39 by adjustable polyurethane springs 53. As before, the first stage of the cropping operation ends when pivot bars 38 and 39 meet adjustable stops 54, and as framework 44 continues to descend, thereafter the effect upon the workpiece is predominantly one of shear. Once the crop is complete the severed end of the workpiece falls clear of the apparatus through the aperture in plate 48, ram 50 is withdrawn upwardly, and springs 53 serve to return framework 44 to the position relative to base 37 in which it is shown in FIG. 3. The workpiece will then of course be advanced axially within jaw units 7 and 11 to present another length for cropping.

Tests suggest the first, essentially torsional stage of the method tends to create an accurate transverse plane of weakness within the workpiece, which then readily severs in the following linear shearing stage of the method. It also appears that the first stage is economical in power consumption, and by weakening the workpiece, enables a cropping machine of given slide force to crop workpieces of greater section than it would have been able to do had it been able to perform only the second stage of the method.

It may be desirable to have the facility for easily altering the setting of each jaw unit within its arm, for instance so that the diagonals of the square-section workpiece shown in the Figures may be set to some orientation other than vertical and horizontal. Such facility is easy to provide if the units and arms are held together by clamping rings as shown in FIG. 3, and for positive engagement each jaw unit may present a male conical surface to engage against a corresponding female surface of the arm (not shown).

While the invention has been described with reference to the cropping of workpieces of polygonal section, where the cropping jaws or dies may register positively with the work by reason of their polygonal shape, the invention applies also to cropping of workpieces of circular section where the jaws may require to grip the work.

We claim:
1. Apparatus for shearing a workpiece comprising:
two lever arms;
each said lever arm having a pivotal mounting, whereby said arms may pivot about parallel axes;
a jaw unit carried by each said lever arm, whereby to hold said workpiece;
slide means whereby the pivotal mounting of each said lever arm may execute sliding movement;
stops associated with said slide means whereby said sliding movements of said lever arms may be arrested, and
means to cause said lever arms to pivot about said mountings and by so doing to execute a shearing action upon a workpiece held in said jaw units, whereby said shearing action may comprise two successive stages, in the first of which stages said pivotal mountings execute sliding movement within their said slide means, and in the second of said stages such sliding is arrested by contact with said stops.

2. Apparatus according to claim 1 in which said stops are adjustable so that the extent of said sliding movement can be varied.

3. Apparatus according to claim 1 in which a controllable resistance is provided to oppose said sliding movement within said slide means.

4. Apparatus according to claim 1 in which the directions of sliding movement of said pivotal mountings within their said slide means are parallel.

5. Apparatus according to claim 4 in which the directions of sliding movement of said pivotal mountings within their said slide means are co-linear.

6. Apparatus according to claim 1 comprising a base unit and a framework mounted upon it for relative sliding in a direction parallel to said intended direction of shear, in which said pivotal mountings of said lever arms are mounted upon said framework and in which the ends of said lever arms in which said jaw units are mounted are adapted to bear against said base unit during operation, whereby the axis of said workpiece is held to a substantially constant location during said shearing.

7. A method of shearing a workpiece comprising two successive stages, including the steps of:
   inserting said workpiece into two dies for holding said workpiece throughout said stages;
   in the first of said stages, subjecting said workpiece to substantial torque about an axis perpendicular to the intended direction of said shear; and
   in the second of said stages, subjecting said dies to symmetrical movements and subjecting said workpiece to less torque but also to substantial linear shear in said intended direction.

8. A method of shearing a workpiece as claimed in claim 7 comprising the step of moving said two dies in symmetrical movements during said first of said stages.

* * * * *